United States Patent
Dietl et al.

(10) Patent No.: US 7,260,380 B2
(45) Date of Patent: Aug. 21, 2007

(54) STORING AND SYNCHRONIZING DATA ON A REMOVABLE STORAGE MEDIUM

(75) Inventors: Josef Dietl, Nussloch (DE); Thomas Arend, Mannheim (DE)

(73) Assignee: SAP Aktiengesellschaft, Walldorf (DE)

( * ) Notice: Subject to any disclaimer, the term of this patent is extended or adjusted under 35 U.S.C. 154(b) by 663 days.

(21) Appl. No.: 10/739,524

(22) Filed: Dec. 18, 2003

(65) Prior Publication Data

US 2005/0136979 A1 Jun. 23, 2005

(51) Int. Cl.
*H04M 1/66* (2006.01)
(52) U.S. Cl. .................................. 455/410; 713/189
(58) Field of Classification Search ............... 455/410, 455/411, 557, 558; 380/281, 284, 3, 4; 713/189, 713/193
See application file for complete search history.

(56) References Cited

U.S. PATENT DOCUMENTS

| | | | |
|---|---|---|---|
| 5,680,864 A | 10/1997 | Morgan et al. | 128/696 |
| 5,696,825 A * | 12/1997 | Johnson et al. | 713/193 |
| 5,870,477 A * | 2/1999 | Sasaki et al. | 713/165 |
| 5,933,498 A * | 8/1999 | Schneck et al. | 705/54 |

* cited by examiner

*Primary Examiner*—Edward F. Urban
*Assistant Examiner*—Tu X. Nguyen
(74) *Attorney, Agent, or Firm*—Fish & Richardson P.C.

(57) ABSTRACT

Methods and apparatus, including computer program products, for storing data for use on a mobile device on a removable storage medium. To access the data, credentials are received from a user of a mobile device. An encrypted set of data is transferred to the mobile device from the removable storage medium, which is in communication with the mobile device, in response to instructions from an application associated with the data. The encrypted set of data is decrypted based on the credentials, and the decrypted set of data is automatically erased from the mobile device. The removable storage medium can be removed from the mobile device, and the encrypted data can be synchronized with a central database using a proxy device.

19 Claims, 5 Drawing Sheets

FIG.
3

STORING AND SYNCHRONIZING DATA ON A REMOVABLE STORAGE MEDIUM

BACKGROUND

The present invention relates to data processing by digital computer, and more particularly to storing and synchronizing data on a removable storage medium to allow sharing of portable devices.

The operating systems for certain mobile electronic devices, such as cellular phones and personal digital assistants (PDAs), are typically designed for use by a single user. While mobile electronic devices frequently are used by only one person, companies sometimes have a group of mobile electronic devices that are shared by multiple users. A specific user's data is typically accessible by other users of the same device.

For privacy, individual users of shared mobile electronic devices may store their data on a removable storage medium, such as a memory card. However, the data on the removable storage medium is sometimes copied to the internal storage medium of the mobile device, which typically allows other users to access the data if the data is not erased. In addition, if a user loses or misplaces the removable storage medium, the data stored on the removable storage medium can usually be accessed by anyone who happens to find the removable storage medium if the data is not somehow protected. Some removable storage devices can be protected with a password or may allow individual files to be encrypted for security.

Some mobile electronic devices provide a way to synchronize stored data with an associated database located on another device. When synchronization occurs, the associated database typically is updated with new and changed data from the mobile device, and the mobile device is updated with new and changed data from the database. A removable storage medium typically must be connected to the mobile device for the data on the removable storage medium to be synchronized with the associated database.

SUMMARY OF THE INVENTION

The present invention provides methods and apparatus, including computer program products, for storing and accessing data on a removable storage medium for use on a mobile device and for synchronizing the stored data with a central database.

In general, in one aspect, the invention features receiving credentials from a user of the mobile device and transferring an encrypted set of data to the mobile device from the removable storage medium that is in communication with the mobile device. The encrypted set of data is transferred to the mobile device in response to instructions from an application associated with the data. The encrypted set of data is decrypted by the application based on the credentials, and the decrypted set of data is automatically erased from the mobile device. The invention can be implemented to include one or more of the following advantageous features. New data is received on the mobile device, and the decrypted set of data is changed based on the received new data. The changed set of data is encrypted based on the credentials, and the encrypted changed set of data from the mobile device is stored on the removable storage medium. The decrypted set of data is automatically erased in response to storing the encrypted changed set of data on the removable storage medium. Alternatively, the decrypted set of data is automatically erased subsequent to providing access to the decrypted set of data using the application ta enable changes to be made to the data, and automatically erasing the decrypted set of data is performed in response to closing the application.

A set of data is transferred from the mobile device to the connected removable storage medium. The set of data is stored on the removable storage medium in an encrypted form. The removable storage medium is disconnected from the mobile device and connected to a proxy device. A user of the proxy device provides credentials, and the encrypted set of data is transferred from the removable storage medium to the proxy device in response to instructions from a second application on the proxy device. The second application can be the same as (i.e., another copy of) the application associated with the data or can be a somewhat different application (e.g., with a more limited functionality). The encrypted set of data is decrypted by the second application based on the credentials and using the proxy device, and the decrypted set of data is synchronized with a central data set.

In another general aspect, a mobile device is shared by providing a first user with a mobile device and with a first removable storage medium and connecting the first removable storage medium to the mobile device. A first set of credentials, associated with the first user, is provided to the mobile device. Encrypted data stored on the first removable storage medium is decrypted based on the first set of credentials to form a first set of decrypted data, and the mobile device is used with the first set of decrypted data. At least part of the first set of decrypted data is automatically erased, and the first removable storage medium is disconnected from the mobile device. A second user is provided with the mobile device and a second removable storage medium, and the second removable storage medium is connected to the mobile device. A second set of credentials, associated with the second user, is provided to the mobile device. Encrypted data stored on the second removable storage medium is decrypted based on the second set of credentials to form a second set of decrypted data, and the mobile device is used with the second set of decrypted data.

The invention can be implemented to include one or more of the following advantageous features. Data from the mobile device is encrypted using the first set of credentials to form a first set of encrypted data, and the first set of encrypted data is stored on the first removable storage medium prior to disconnecting the first removable storage medium. The first removable storage medium is connected to a proxy device after disconnecting the first removable storage medium from the mobile device, and the first set of credentials is provided to the proxy device. The first set of encrypted data is decrypted using the proxy device, and at least part of the decrypted first set of encrypted data is synchronized with a database.

The described techniques may be implemented as a method, system, or a computer program product that is tangibly stored on a computer-readable medium and that includes instructions operable to cause a data processing apparatus to implement the techniques.

The invention can be implemented to realize one or more of the following advantages. The invention can allow a particular user's data to be kept private from other users of a portable device. A user's data can be kept private even if the removable storage medium on which the data is stored is lost or stolen. Data on the removable storage medium can be synchronized with middleware by using a proxy for the portable device. User data can be erased from the portable device when the user is done using the portable device, such as when the user is ready to provide the portable device to another user. One implementation of the invention provides all of the above advantages.

The details of one or more implementations of the invention are set forth in the accompanying drawings and the description below. Further features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
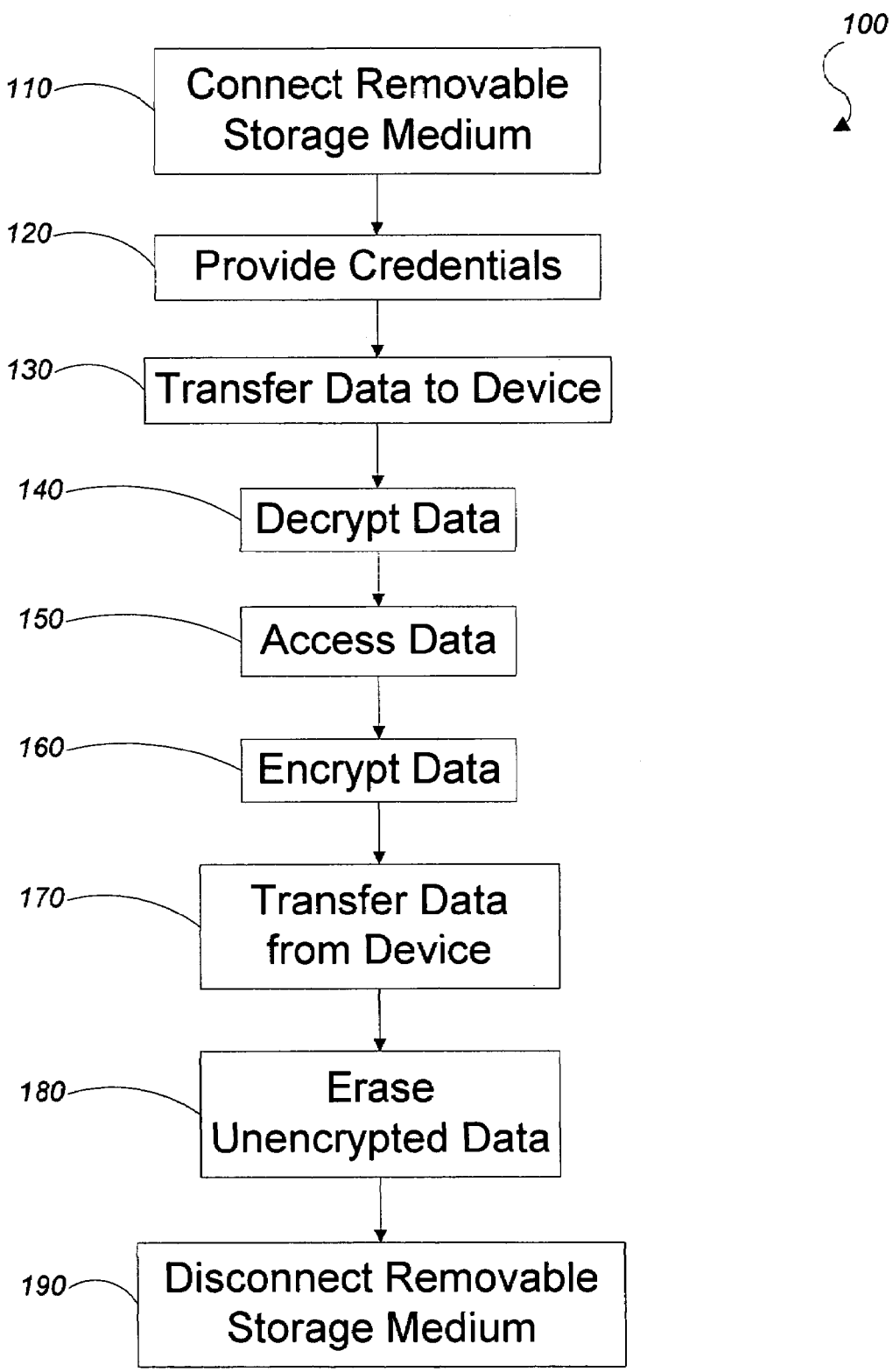
FIG. 1 is a flowchart showing a process for using encrypted data stored on a removable storage medium by a mobile device.

Mobile devices are sometimes used by multiple users. For example, a company with multiple salespeople can provide the salespeople with mobile devices to track and enter customer information, order quantities, and order statuses. If there are times when a salesperson does not need a mobile device (e.g., if the salesperson does not have any appointments for a period of time), the mobile device can be used by a different salesperson. Sharing mobile devices can reduce costs for the company. Each salesperson can keep data on a removable storage medium that is associated with the salesperson so that the data is kept private from other users of the mobile device. The data on a mobile device can typically be synchronized with a central database to update the database with new data from the mobile device and/or to update the mobile device with new data from the database. Synchronization of data typically requires that the mobile device be connected to another device that can update the central database. For example, the mobile device may be connected to a desktop computer that communicates with a database server. If a salesperson keeps data on a removable storage medium, the removable storage medium typically has to be connected to the mobile device for the data on the removable storage medium to be synchronized with the central database.

In a sample scenario, a first salesperson has appointments with customers in the morning, but not in the afternoon. A second salesperson has appointments in the afternoon, but not in the morning. The first salesperson may check out a mobile device from a pool of available devices at his office in the morning and connect a removable storage medium containing the first salesperson's private data (e.g., customer information) to the mobile device. The first salesperson may go to his appointments and enter new data on the mobile device. The data may then be stored on the first salesperson's removable storage medium. After the appointments, the first salesperson may disconnect the removable storage device from the mobile device and give the mobile device to the second salesperson. The second salesperson may connect her own removable storage device to the mobile device and enter data on the mobile device. The data may be stored on the second salesperson's removable storage device. At this point, the first salesperson may not be able to synchronize the updated data with the central database because the first salesperson no longer has the mobile device. Additionally, if the first salesperson did not erase private data from the mobile device's internal storage medium, the second salesperson may be able to access the private data. If the first salesperson loses the removable storage medium, the private data on the removable storage medium can be read by an unauthorized person.

This specification describes how these and other problems can be alleviated by encrypting private data stored on the removable storage medium, by providing for a mobile device or an application on the mobile device to encrypt and decrypt data based on credentials provided by a user, and by providing for the user to synchronize the data on a removable storage medium when the user does not have access to the mobile device.

FIG. 1 illustrates a process 100 for using encrypted data stored on a removable storage medium in an application that is executed on a mobile device. A mobile device is any type of device that can be carried by a person. In some cases, a mobile device may be used while the person is moving. Mobile devices may include, for example, personal digital assistants (PDAs), digital cameras, and mobile phones.

A removable storage medium is connected to the mobile device (step 110). This connection can be accomplished in different ways depending on the device, including inserting the removable storage medium into a slot in the device, physically attaching the medium to the exterior of the device, or connecting the medium and the device with a wire or cable. In some cases, instead of connecting the removable storage medium to the mobile device, wireless communication is provided between the device and the removable storage medium. The removable storage medium is removable in the sense that it is designed to be conveniently connected to and removed from the device, either physically or by making and breaking communication, and can be connected to other devices. Each user of the mobile device may have one or more removable storage media.

The user provides credentials to an application running on the device (step 120). Security features (e.g., encryption and decryption) that use the credentials are built into an application that is used to manipulate the data. Possible credentials include a password, a thumbprint, a retinal scan, or a user identification code. The credentials may be unique to the user, or the credentials may be known and usable by a limited number of authorized people. As used in this specification and in the claims, the term "application" means a type of application executable on a device that fulfills a specific purpose (e.g., managing customer records) and that is not necessary for the device to execute other applications. The application can include code that may be reused by different applications, but at runtime the reusable component cannot be detached from the application and reused by another application. The data on a user's associated removable storage medium is encrypted using the user's credentials (e.g. by performing a convolution of the data with the credentials, by applying a symmetric-key block cipher algorithm to the data using the credentials to form the key, or by some other conventional method of encryption). As a result, providing the correct credentials ensures that the user is authorized to access the encrypted data. The data is encrypted and stored on the removable storage medium so that other users of the mobile device cannot access the data.

Once the user provides credentials, the encrypted data is transferred by the application from the removable storage medium to a device storage medium (e.g., internal device memory or a hard disk drive) by copying or moving the encrypted data (step 130). In some implementations, the encrypted data can be accessed directly from the removable storage medium instead of copying or moving the data to the mobile device or to the proxy. The encrypted data is decrypted using the user's credentials, either during the transfer or after the encrypted data has been transferred (step 140). The decrypted data can then be accessed or changed in the decrypting application (step 150). New data can be generated in step 150 and can be encrypted and stored on the removable storage medium in subsequent steps. The application that uses the data generally performs the encryption and decryption of the data. As a result, the application and data are tied together, and the encrypted data is accessible only by the particular application.

When an event occurs that prompts the application or the device to write data onto the removable storage device (e.g., the user saves the data or exits the application), the application or the device encrypts the data, including any changes to the data, using the user's credentials (step 160) and transfers the encrypted data to the removable storage medium (step 170). In some situations and/or implementations, the data may not be encrypted and transferred to the removable storage medium. For example, if the data has not changed or the application is not authorized or able to change the data, there may be no need to encrypt and transfer the data back to the removable storage medium. Once the data is no longer needed by an application, the unencrypted data is automatically erased from the device storage medium so that applications or users cannot access the data without providing the proper credentials (step 180). The user can then disconnect the removable storage medium from the device (step 190).

To update a database with changed data from the mobile device, and to update the mobile device with changed data from the database, the user can synchronize the mobile device with middleware that interfaces with the database. When mobile devices are shared, the user may not always have access to a mobile device and thus may not be able to use a mobile device to synchronize the data on the removable storage medium with the middleware. Accordingly, the primary or only communication between the middleware, which typically acts as a type of server, and the mobile device, which typically acts as a client, is conducted using the removable storage medium. Copies of the application reside on the mobile device and on a proxy device. Both the mobile device and the proxy device copy encrypted data from the removable storage medium and perform decrypting and encrypting of the underlying data under control of the application.

Figure 2:
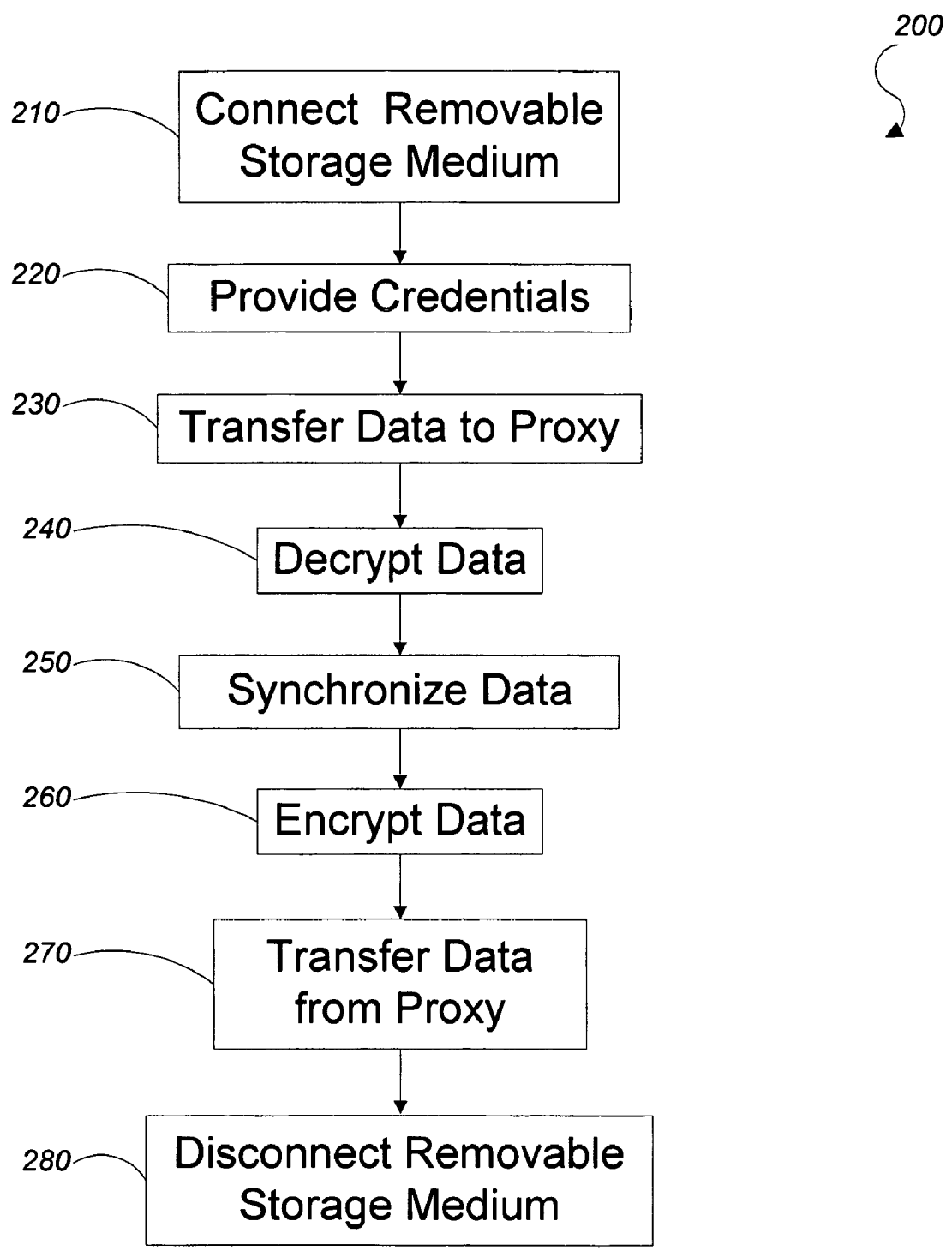
FIG. 2 is a flowchart showing a process for synchronizing encrypted data stored on a removable storage medium with middleware by using a proxy.

FIG. 2 illustrates a process 200 for synchronizing the data on the removable storage medium with middleware using a proxy. The middleware may represent an interface between applications and/or databases, such as between the data stored on a removable storage medium and a central database or between an inventory-management program and a database. The proxy may be a different type of device than the mobile device, and the proxy may be used to synchronize the data on the removable storage medium with the middleware when the mobile device is not available. The proxy may or may not be able to perform all of the same data processing functions as the mobile device. The proxy may or may not be a type of mobile device, but the proxy cannot be used as a replacement for the shared mobile device in all ways because of a lack of functionality, a lack of portability, or both. Some proxies allow the data to be accessed and changed just like on the mobile device, while other proxies can only be used to synchronize the data on the removable storage medium with the middleware. In one implementation, the proxy is a desktop computer that runs software for performing synchronization. In another implementation, the proxy is a dedicated synchronization device with a synchronization program stored in firmware.

In the process 200, the user connects the removable storage medium to the proxy (step 210). The user provides the credentials to a synchronization application on the proxy (step 220). The credentials may be the same credentials or the same type of credentials as are provided to the mobile device in step 120 of process 100 (see FIG. 1). The proxy can next copy or move data from the removable storage medium to the proxy (step 230). The encrypted data is decrypted (step 240) using the user's credentials. The decrypted data can then be synchronized with middleware (step 250). A synchronization can update the middleware with new or changed data from the removable storage device and/or update the removable storage device with new or changed data from the middleware. The synchronization can copy all of the decrypted data from the proxy to the middleware, or it can only copy the data that has changed since the last synchronization. Alternatively, the synchronization need not copy any data from the proxy to the middleware. The synchronization can copy all of the data from the middleware to the proxy so that the data can be encrypted and copied to the removable storage medium. Alternatively, the synchronization can copy only the data that has changed on the middleware since the last synchronization with the proxy, or the synchronization may not copy any data to the proxy at all. When the synchronization is complete, the proxy encrypts the synchronized data from the middleware (if any) using the user's credentials (step 260) and transfers the encrypted data back to the removable storage medium (step 270). The user can then disconnect the removable storage medium from the proxy (step 280).

Figure 3:
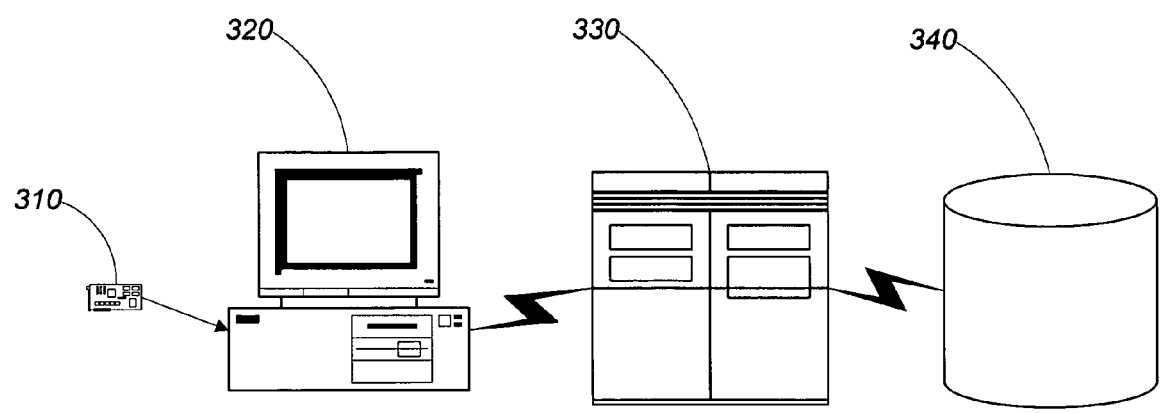
FIG. 3 shows a system for synchronizing a removable storage medium with a database.

FIG. 3 shows a system that can be used to synchronize a removable storage medium 310 with a database 340. The removable storage medium 310 is connected to a proxy 320. The proxy 320 is in communication with middleware 330 using, for example, an Ethernet connection. The middleware 330 is in communication with the database 340. A synchronization application is executed on the proxy 320 and communicates with the removable storage medium 310 and the middleware 330 as discussed in the context of FIG. 2. The middleware 330 serves as an interface between the synchronization application running on the proxy 320 and database 340. The proxy 320, the middleware 330, and the database 340 may physically be located on different devices that are remote from each other and that communicate through a wide area network (e.g., the Internet) or that are close to each other and that communicate through a local area network or through a wired or wireless connection between the devices. In another possible implementation, the proxy 320 is a server, and the middleware 330 and the database 340 are both physically located on the proxy 320. In another implementation, the functionality of the middleware 330 is incorporated into an application on the proxy 320 used to encrypt and decrypt the data on the removable storage device.

Figure 4:
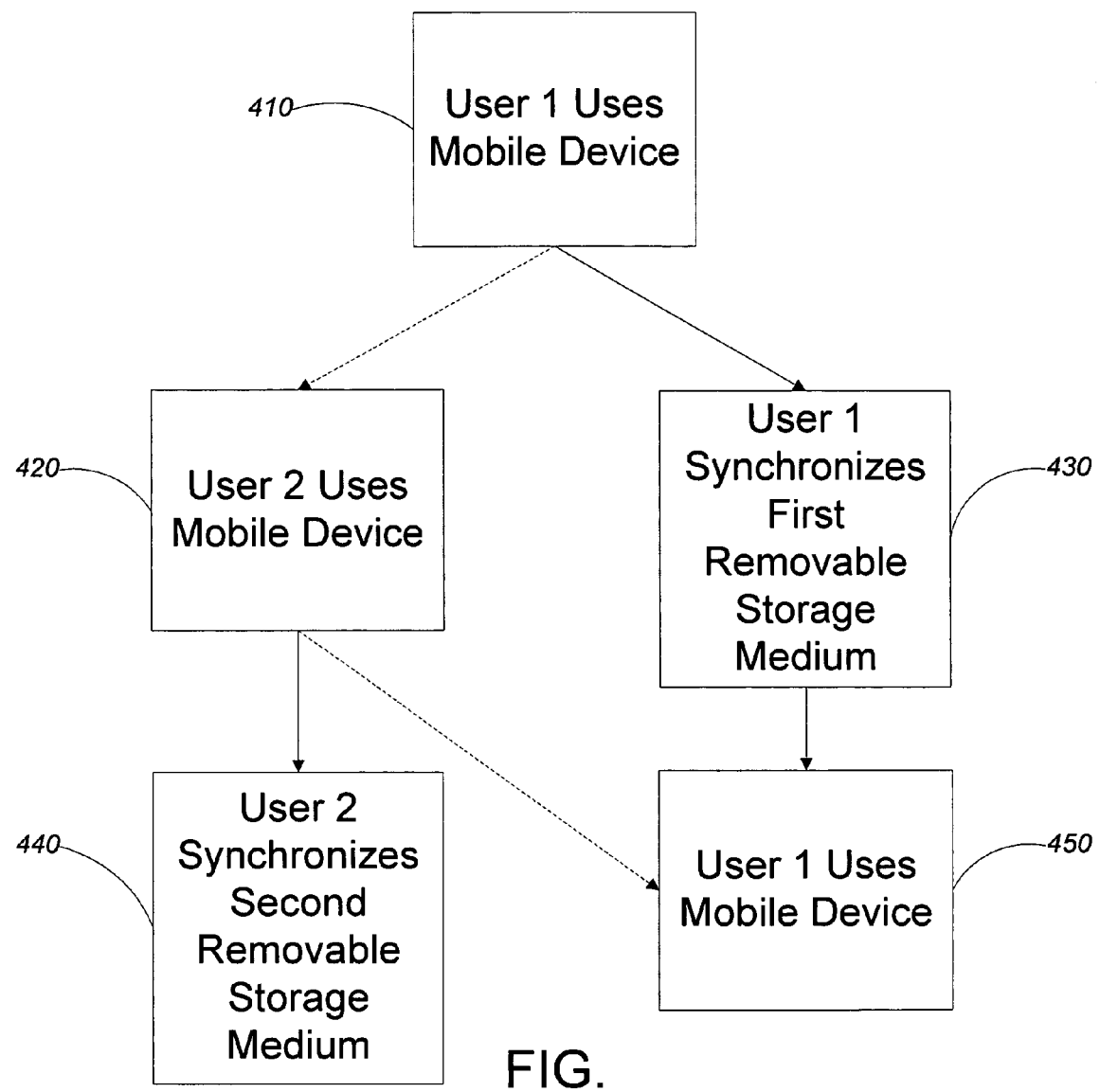
FIG. 4 is a flowchart of a process for allowing two users to share a mobile device.

FIG. 4 illustrates a process in which two users use a single mobile device to access and work with data stored on their own respective removable storage media. A first user begins by using the mobile device (step 410). The first user may use the mobile device (as described in the context of FIG. 1) by connecting a first removable storage medium to the mobile device, providing credentials, accessing data, and disconnecting the first removable storage medium from the mobile device. The first user then makes the mobile device available to a second user. The second user connects a second removable storage medium to the mobile device and uses the mobile device (step 420). While the mobile device is in the second user's possession, the first user synchronizes the first removable storage medium with middleware using a proxy for the mobile device (step 430), as described in the context of FIG. 2. When the second user is finished using the mobile device, the second user disconnects the second removable storage medium from the mobile device and makes the mobile device available to the first user (or to some other user). The second user synchronizes the second removable storage medium with middleware using a proxy for the mobile device (step 440), and the first user once again may use the mobile device (step 450).

In some implementations, instead of each user having his or her own removable storage device, encrypted data from multiple users can be stored on a single removable storage medium. Each user's data can be encrypted using the respective user's credentials so that the users cannot access one another's data.

The invention can be implemented in digital electronic circuitry, or in computer hardware, firmware, software, or in combinations of them. The invention can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the invention can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

The invention can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the invention, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

Figure 5:
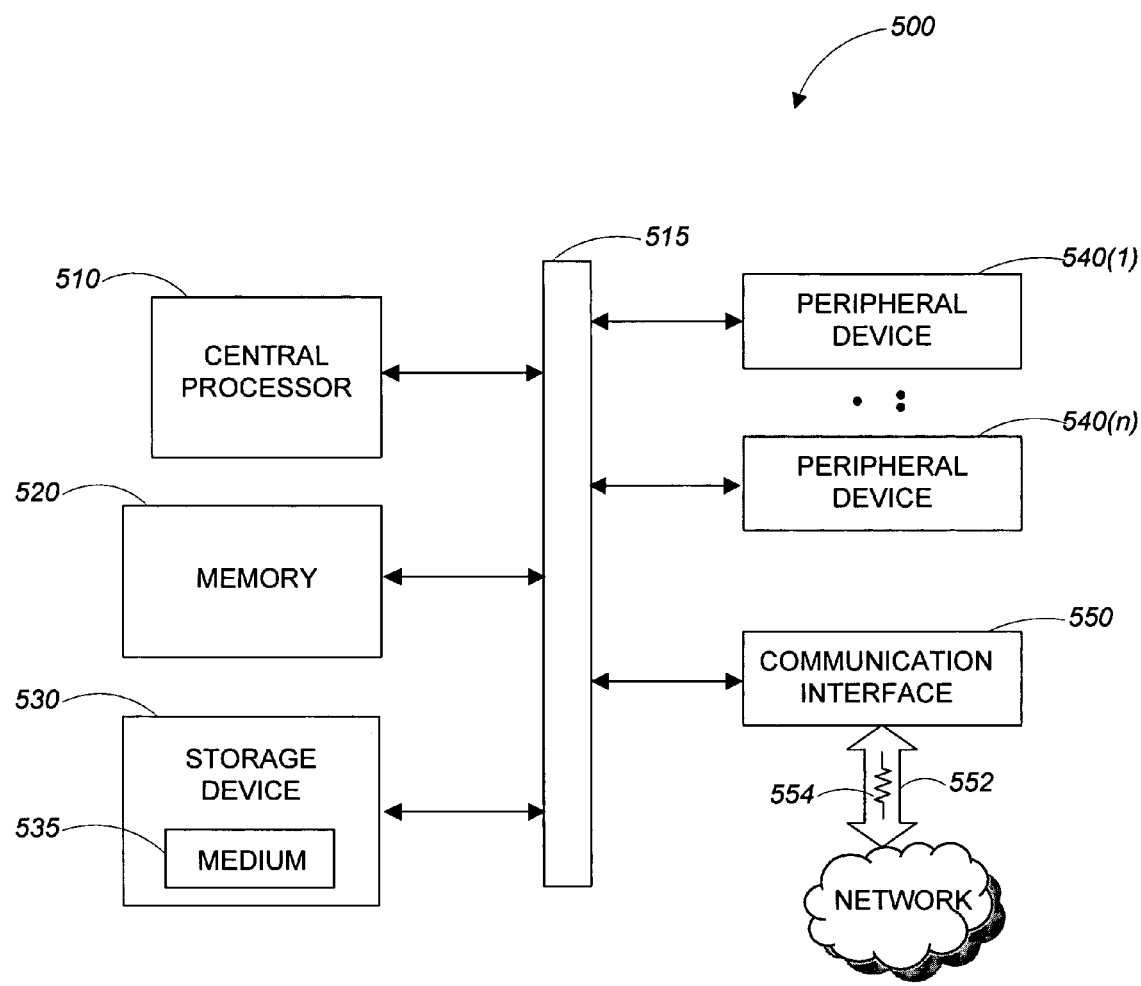
FIG. 5 is a block diagram of a computer system on which the described techniques may be implemented.

FIG. 5 is a block diagram illustrating an example data processing system 500 in which a system for storing and/or synchronizing data on a removable storage medium may be implemented. The data processing system 500 includes a central processor 510, which executes programs, performs data manipulations and controls tasks in the system 500. The central processor 510 is coupled with a bus 515 that can include multiple busses, which may be parallel and/or serial busses.

The data processing system 500 includes a memory 520, which can be volatile and/or non-volatile memory, and is coupled with the communications bus 515. The system 500 can also include one or more cache memories. The data processing system 500 can include a storage device 530 for accessing a storage medium 535, which may be removable, read-only, or read/write media and may be magnetic-based, optical-based, semiconductor-based media, or a combination of these. The data processing system 500 can also include one or more peripheral devices 540(1)-**540(*n*) (collectively, devices 540**), and one or more controllers and/or adapters for providing interface functions.

The system 500 can further include a communication interface 550, which allows software and data to be transferred, in the form of signals 554 over a channel 552, between the system 500 and external devices, networks, or information sources. The signals 554 can embody instructions for causing the system 500 to perform operations. The system 500 represents a programmable machine, and can include various devices such as embedded controllers, Programmable Logic Devices (PLDs), Application Specific Integrated Circuits (ASICs), and the like. Machine instructions (also known as programs, software, software applications or code) can be stored in the machine 500 and/or delivered to the machine 500 over a communication interface. These instructions, when executed, enable the machine 500 to perform the features and function described above. These instructions represent controllers of the machine 500 and can be implemented in a high-level procedural and/or object-oriented programming language, and/or in assembly/machine language. Such languages can be compiled and/or interpreted languages.

As used herein, the term "machine-readable medium" refers to any computer program product, apparatus and/or device used to provide machine instructions and/or data to the machine 500, including a machine-readable medium that receives machine instructions as a machine-readable signal. Examples of a machine-readable medium include the storage medium 535, the memory 520, and/or PLDs, FPGAs, ASICs, and the like.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer.

A number of implementations have been described. Nevertheless, it will be understood that various modifications may be made. For example, the steps of the described processes can be performed in a different order and still achieve desirable results. In addition, the encrypted data stored on the removable storage medium need not be used by an application. In one possible implementation, some or all of the encrypted data on the removable storage medium may be used by the device to configure user preferences and information. Accordingly, other implementations are within the scope of the following claims.

What is claimed is:

1. A method for accessing data for use on a mobile device, the method comprising:
    receiving credentials from a user of a mobile device;
    transferring an encrypted set of data to the mobile device from a removable storage medium in communication with the mobile device in response to instructions from an application associated with the data;
    decrypting the encrypted set of data based on the credentials, with the decryption performed by the application;
    automatically erasing the decrypted set of data from the mobile device;
    disconnecting the removable storage medium from the mobile device;
    connecting the removable storage medium to a proxy device;
    receiving the credentials from a user of the proxy device;
    transferring the encrypted set of data from the removable storage medium to the proxy device in response to instructions from a second application on the proxy device; and
    decrypting the encrypted set of data based on the credentials using the proxy device, with the decryption performed by the second application.

2. The method of claim 1 further comprising:
    receiving new data on the mobile device;
    changing the decrypted set of data based on the received new data;
    encrypting the changed set of data based on the credentials; and
    storing the encrypted changed set of data from the mobile device on the removable storage medium.

3. The method of claim 2 wherein automatically erasing the decrypted set of data is performed in response to storing the encrypted changed set of data on the removable storage medium.

4. The method of claim 1 further comprising:
    providing access to the decrypted set of data using the application to enable changes to be made to the data, wherein the decrypted set of data is automatically erased subsequent to providing access.

5. The method of claim 4 wherein automatically erasing the decrypted set of data is performed in response to closing the application.

6. The method of claim 1 further comprising:
    synchronizing the decrypted set of data transferred to the proxy device with a central data set.

7. The method of claim 6 wherein synchronizing includes transferring at least part of the decrypted set of data to a remote database.

8. A system for accessing data for use on a mobile device, the system comprising:
    means for receiving credentials from a user of a mobile device;
    means for transferring an encrypted set of data to the mobile device from a removable storage medium, when the removable storage medium is communicably coupled to the mobile device in response to instructions from an application associated with the data;
    means for decrypting the encrypted set of data based on the credentials, with the decryption performed by the application;
    means for automatically erasing the decrypted set of data from the mobile device;
    means for receiving credentials from a user of a proxy device;
    means for transferring the encrypted set of data to the proxy device from the removable storage medium in response to instructions from a second application on the proxy device when the removable storage medium is communicably coupled to the proxy device; and
    means for decrypting the encrypted set of data based on the credentials using the proxy device, with the decryption performed by the second application.

9. The system of claim 8 further comprising:
    means for receiving new data on the mobile device;
    means for changing the decrypted set of data based on the received new data;
    means for encrypting the changed set of data based on the credentials; and
    means for storing the encrypted changed set of data from the mobile device on the removable storage medium.

10. The system of claim 9 wherein automatically erasing the decrypted set of data is performed in response to storing the encrypted changed set of data on the removable storage medium.

11. The system of claim 8 further comprising:
    means for providing access to the decrypted set of data using the application to enable changes to be made to the data, wherein the decrypted set of data is automatically erased subsequent to providing access.

12. The system of claim 11 wherein automatically erasing the decrypted set of data is performed in response to closing the application.

13. The system of claim 8 further comprising:
    means for synchronizing the decrypted set of data transferred to the proxy device with a central data set.

14. The system of claim 13 wherein the means for synchronizing includes means for transferring at least part of the decrypted set of data to a remote database.

15. A method for sharing a mobile device, the method comprising:
    providing a first user with a mobile device and with a first removable storage medium;
    connecting the first removable storage medium to the mobile device;
    providing a first set of credentials to the mobile device, the first set of credentials being associated with the first user;

decrypting encrypted data stored on the first removable storage medium based on the first set of credentials to form a first set of decrypted data;

using the mobile device with the first set of decrypted data;

automatically erasing at least part of the first set of decrypted data;

disconnecting the first removable storage medium from the mobile device;

providing a second user with the mobile device and a second removable storage medium;

connecting the second removable storage medium to the mobile device;

providing a second set of credentials to the mobile device, the second set of credentials being associated with the second user;

decrypting encrypted data stored on the second removable storage medium based on the second set of credentials to form a second set of decrypted data;

using the mobile device with the second set of decrypted data;

connecting the first removable storage medium to a proxy device after disconnecting the first removable storage medium from the mobile device;

providing the first set of credentials to the proxy device; and decrypting the first set of encrypted data using the proxy device.

16. The method of claim 15 further comprising:

encrypting data from the mobile device using the first set of credentials to form a first set of encrypted data; and storing the first set of encrypted data on the first removable storage medium prior to disconnecting the first removable storage medium.

17. The method of claim 15 further comprising:

synchronizing at least part of the decrypted first set of encrypted data with a central data set.

18. The method of claim 17 wherein synchronizing includes transferring at least part of the decrypted set of data to a remote database.

19. The method of claim 17 wherein synchronizing further includes transferring at least part of the decrypted set of data to middleware.

* * * * *